United States Patent [19]

Dahlgren

[11] Patent Number: 4,624,564

[45] Date of Patent: Nov. 25, 1986

[54] CALIBRATION STANDARDS FOR FLYING HEIGHT TESTERS

[75] Inventor: Robert P. Dahlgren, Minneapolis, Minn.

[73] Assignee: Magnetic Peripherals Inc., Minneapolis, Minn.

[21] Appl. No.: 718,311

[22] Filed: Apr. 1, 1985

[51] Int. Cl.⁴ .............................................. G11B 5/60
[52] U.S. Cl. ................................... 356/243; 360/103
[58] Field of Search ............... 356/243, 358, 445, 446, 356/128; 250/252.1; 369/55; 360/103

[56] References Cited

U.S. PATENT DOCUMENTS 3,678,219  7/1972  Dennis .............................. 360/103
4,346,996  8/1982  Miller ............................... 356/243

Primary Examiner—Eugene R. LaRoche
Assistant Examiner—Robert J. Pascal
Attorney, Agent, or Firm—J. A. Genovese; R. M. Angus

[57] ABSTRACT

A calibration standard simulates predetermined flying characteristics of a magnetic head for calibrating flying height testers. The standard comprises a substrate having a reflective layer supported thereon. A transparent layer is disposed over the reflective layer so that the reflective layer is disposed at a predetermined angle to a surface of the transparent layer, the predetermined angle representative of a predetermined flying angle of a head over a disk, the transparent layer having a thickness representative of a predetermined flying height of a head over a disk. A process for manufacturing and calibrating the calibration standard is also described.

3 Claims, 8 Drawing Figures

CALIBRATION STANDARDS FOR FLYING HEIGHT TESTERS

This invention relates to apparatus for testing the flying height characteristics of magnetic heads, and particularly to apparatus for calibrating flying height testers used to test flying height characteristics of magnetic heads.

BACKGROUND OF THE INVENTION

In the disk recording art, it is common to use read/write heads which "fly" over the surface of the rotating disk. Aerodynamic surfaces on the head assembly react against the air moved with the revolving disk causing the heads to "fly" a small distance from the disk surface. In the manufacture of such read/write heads, it is common to test the aerodynamic characteristics of the head so that the flying height characteristics are known, thereby avoiding use of heads which "fly" too high or too low in relationship to the disk surface or at an improper angle to the disk.

Flying height testing is ordinarily accomplished by means of a flying height tester, using optical interference technique. Such a flying height tester comprises, for example, a monochromatic light source such as a tunable monochroaator directing monochromatic light at a glass disk. The glass disk is rotated at speeds simulating the rotation of a magnetic disk, and the head/arm assembly being tested is positioned in a holder or clamp in flying relation to the revolving glass disk. Monochromatic light is directed at the disk at a predetermined angle to the surface thereof. Light is reflected from the surface of the disk closest to the flying head, and from the surface of the flying head itself, and impinges onto a sensor, such as a television camera or other light-sensitive sensor. With the head in its flying position, monochromatic light reflected from the disk and from the head impinge upon the sensor in additive (constructive interference) and subtractive (destructive interference) modes to create a pattern of light sectors of bright and dark sectors, the sectors being bounded by "fringes" as they are known in the industry. The distance between the fringes is representative of the angle between the head and the disk, and the position of the fringes relative to the image of the edge of the head is representative of the distance, or flying height, between the head and disk. A computer, such as a Hewlett-Packard HP-85 computer, programmed to receive data from the head tester, can calculate the perceived flying height and angle of the head using the detected fringe pattern distances. For further details concerning flying height testers using optical interference techniques, see "Techniques for the Measurement of Air-Bearing Separation—A Review" by C. Lin, IEEE Transactions on Magnetics, Vol. MAG-9, No. 4, pages 673–677 (December 1973).

In the past, calibration of flying height testers has been accomplished through the use of a standard head whose characteristics are known. However, arm flight characteristics, gimble spring characteristics, etc., of the standard head change after repeated use and abuse. Further, dust, skin oil and other foreign matter may alter the flying characteristics and/or reflective surface of the standard head, altering the calibration of the standard. Because the flying orientation of a head is in part affected by the speed, radius, and stacking height of the magnetic disk, the actual field conditions of a head could not be duplicated and it was necessary that heads be accepted that have characteristics within given acceptable ranges. Calibration of production heads could only be accomplished in relationship to the calibration of the tester by the given standard; the standard could not be calibrated in absolute terms. It was not possible to calibrate heads on different machines with any degree of relative accuracy.

SUMMARY OF THE INVENTION

It is an object to the present invention to provide an improved calibration standard for flying height testers. Another object of the present invention is to improve the calibration techniques for flying height testers so that a plurality of such testers aay be standardized in relationship to each other. Another object of the present invention is to provide an improved calibration standard for a flying height tester which permits calibration in absolute terms, rather than in relative terms.

One feature of the invention resides in the provision of a reference standard calibrated in absolute terms so production heads can themselves be measured in absolute terms.

Another feature of the present invention is the provision of a reference standard for a flying height tester which is insensitive to disk velocity, tilt or contamination and which is easily used without significant modification to the test procedure or equipment. In particular, it is not necessary to remove the tester glass disk during calibration.

BRIEF DESCRIPTION OF DRAWINGS

The above and other features of this invention will be more fully understood from the following detailed description and accompanying drawings in which.

DETAILED DESCRIPTION

Figure 1:
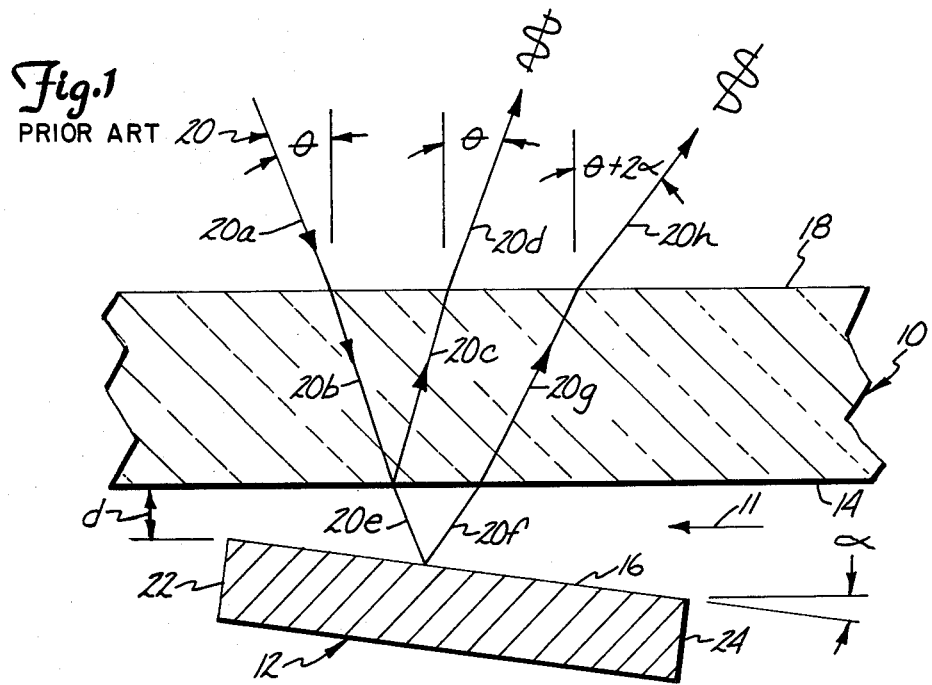
FIG. 1 is a diagrammatic view in cutaway cross-section of a standard flying height tester for measuring flying height characteristics of magnetic heads.

Referring to the drawings, and particularly FIG. 1, there is illustrated the head and the disk of a flying height tester, as is used in testing production heads for flying height characteristics and also as used in calibrating such testers in accordance with prior art. As shown in FIG. 1, a transparent disk, such as a glass disk 10 is rotated about its axis (not shown) so that magnetic head 12 flies a short distance from the surface 14 of disk 10 due to air flowing in the direction of arrow 11 caused by rotation of disk 10. Monochromatic light from a source, such as a tunable monochromator (not shown), is directed along a path through disk 10 to reflect off surface 14 of disk 10 and surface 16 of head 12 to be reflected onto a sensor (not shown). Specifically, the monochromatic light impinges disk 10 at an incident angle $\theta$ to surface 18 and follows a path 20a through surface 18 of disk 10, path 20b through the disk, is split and partially reflected off surface 14 to follow path 20c through the disk and thereupon path 20d to the sensor (not shown). The other split light path follows path 20e to reflect off surface 16 of head 12 to follow path 20f through surface 14 of the disk, path 20g through the disk and path 20h to the sensor. The slight angular deviations at the interface between air and the disk are caused by the Snell effect. It should be noted that paths 20a and 20d are each oriented at angle $\theta$ from the vertical (normal to the plane of surfaces 18 and 14) and that path 20h is not parallel to path 20d but instead is at an angle $\theta + 2\alpha$ to the vertical, where angle $\alpha$ is the angle of orientation of the flying head.

Path 20a represents only one of numerous parallel paths of light used in the tester. The sensor, therefore, will receive light from the paths 20d and 20h of each of the numerous paths 20a. As a result, the received light will include, at any given location on the sensor, light from a path 20d from one beam and light from a path 20h from another beam. The result is that the light from paths 20d and 20h is additive and subtractive in accordance with the differences in the respective path lengths, (caused by the flying height distance and angle), so segments of bright and dark light appear to the sensor. Therefore, sensor will view a reflective pattern consisting of optical wavefronts, or fringes, in the color of the monochromatic light, the wavefronts separating approximately equal segments of bright and dark and reflected light portions. The reflective light pattern across the entire magnetic head, from surface 22 to surface 24, will be viewed by the sensor. The distance between the fringes is representative of the angle $\alpha$ of orientation of the magnetic head, and the position of the fringe pattern relative to the edges of the image of the head caused by edges 22 and 24 is representative of the distance, d, of the head to surface 14 of the disk. Consequently, by measuring the distance between the pattern and the perceived edge of the head, and by measuring the distance between the fringes the orientation angle $\alpha$, and flying height d can be calculated, presuming incident angle $\theta$ and the wave length of the monochromatic light are known.

In the past, flying height testers were calibrated using a head whose flying characteristics were known to be adequate. However, the absolute characteristics of the standard were not known. Production heads were tested with the calibrated tester, but production heads could only be tested in relationship to the "standard" established by the calibrating head, not in absolute terms. Repeated use of the "standard" head often altered its characteristics, thereby causing changes in the calibration of the tester. Further it was not possible to relatively calibrate production heads tested by different flying height testers.

Figure 2:
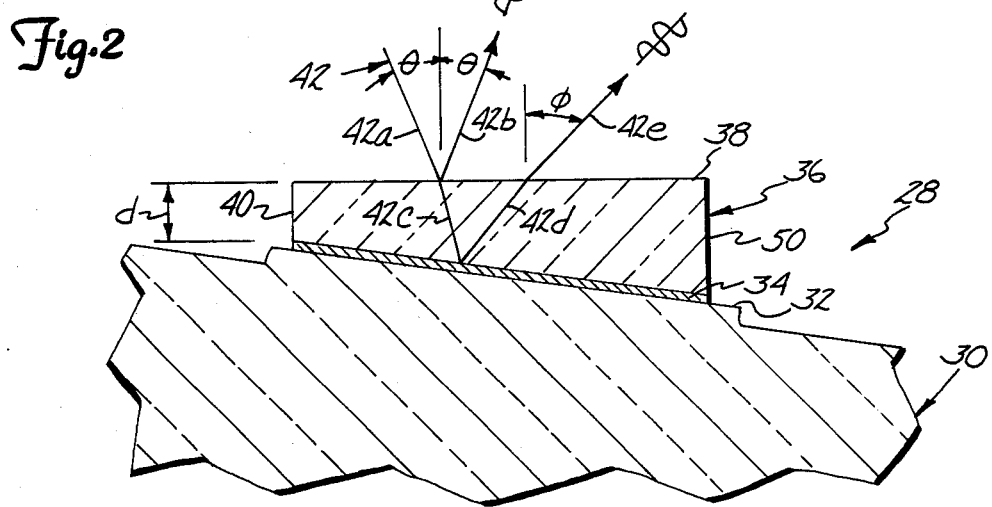
FIG. 2 is a diagramatic view, in cutaway cross-section, of a reference standard for calibrating a flying height tester.

The present invention concerns a method and apparatus for standardizing the calibration of a flying height tester. As shown in FIG. 2, a standard unit 28 comprises a transparent substrate 30, such as glass, having a surface 32 on which is partially deposited a reflective coating 34, such as a thin layer of chrome. Layer 34 is deposited on surface 32, and glass layer 36 is deposited over layer 34; layer 36 having a upper surface 38 at angle $\alpha$ to surface 34, representative of a predetermined flying angle of a head. Layer 36 has a thickness established by the height of surface 40 equal to a desired standard flying height. For example, the height of surface 40 may be of the order of 0.25 microns, approxiaately equal to a desired dimension, d, in FIG. 1.

To calibrate a flying height tester using the standard illustrated in FIG. 2, the standard unit 28 is positioned in the tester. The disk is maintained a distance from the unit 28 greater than the coherence length of light so that it does not optically interfere with the fringe pattern on the sensor; it is not necessary to remove the disk, nor to rotate it during calibration. Monochromatic light is directed at standard 28 along path 42. Particularly, the light impinges surface 38 at angle $\theta$ and follows path 42a to surface 38 of layer 36 where it is divided, and partially reflected at angle $\theta$ along path 42b to the sensor (not shown). The remaining light follows path 42c, at a slight angle to path 42a, due to the Snell affect, is reflected off surface 34, through layer 36 following path 42d, and directed at the sensor at angle $\phi$ via path 42e. Reflecting surface 38 is equivalent to reflecting surface 14 of the disk in FIG. 1, and reflecting surface 34 is equivalent to surface 16 of head 12 in FIG. 1. As will be more fully explained hereinafter, it is important to note that angle $\phi$ is not equal to $\theta + 2\alpha$.

Due to the additive and subtractive nature of the reflected light following overlapping paths 42b and 42e, segments of high intensity monochromatic light will be reflected separated by dark segments with wavefronts or "fringes" of monochromatic light. Using light reflected from the standard, the flying height tester may be calibrated, and heads aay thereafter be tested (as illustrated in the procedure shown in FIG. 1). Heads so calibrated will be absolutely calibrated. In operations where a plurality of flying height testers are utilized, separate "standard" calibrating units may be used for each tester. Since the height 40 of each standard is absolutely known, the relative height of the standard units are calibrated and the absolute flying height of each production head can be readily ascertained.

Figure 3A:
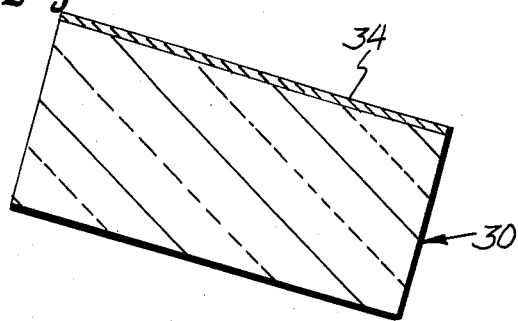
FIGS. 3A–3F illustrates the process for manufacturing the standard illustrated in FIG. 2.
Figure 3B:
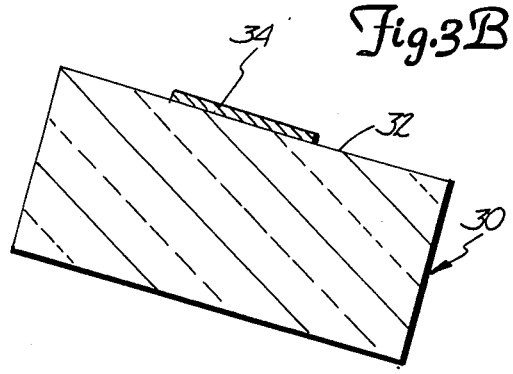
Figure 3C:
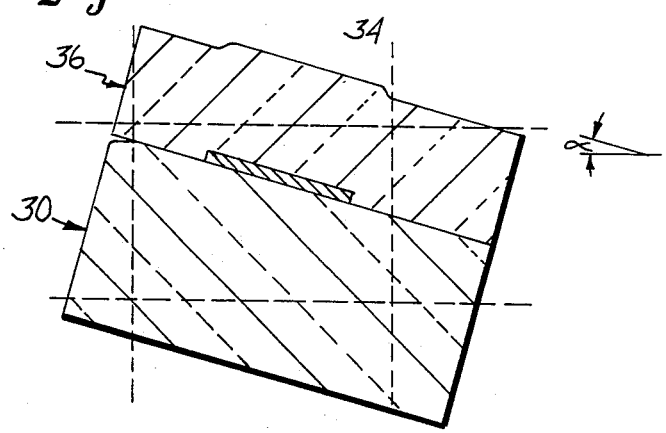
Figure 3D:
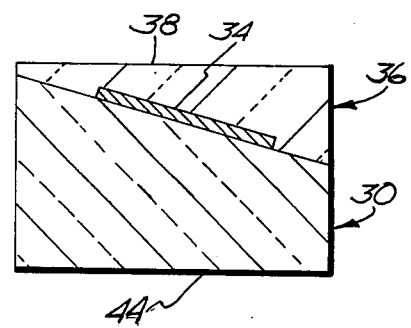
Figure 3E:
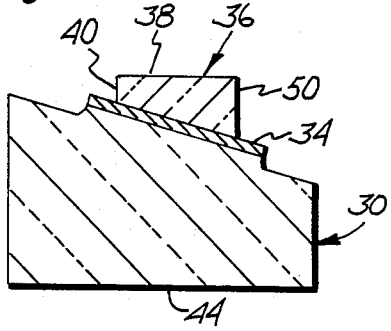
Figure 3F:
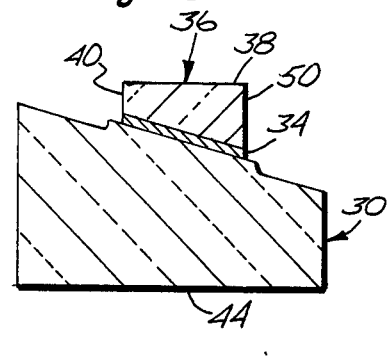

FIGS. 3A–3F illustrate the process of manufacturing the reference standard 28 illustrated in FIG. 2. A glass substrate 30 has a layer 34 of chrome sputter deposited onto an upper surface thereof. Chrome layer 34 is thereupon etched back to a rectangular configuration illustrated in FIG. 3B, visually duplicating a head surface. Layer 36 of glass is deposited over glass substrate 30 and chrome layer 34 as shown in FIG. 3C. (Although FIG. 3A–3C illustrate the unit in its final angular configuration, it is understood that the deposit of layers 34 and 36 is accomplished in a more conventional orientation during manufacture.) Substrate 30 and layer 36 are thereafter lapped at their upper surface 38 at an angle $\alpha$ representative of the flying angle of a magnetic head; lower surface 44 thereafter being ground approximately parallel to surface 38 and at the desired angle $\alpha$ to the surface of layer 34. Thereafter, excess overcoat 36 is etched away leaving the configuration illustrated in FIG. 3E with the overcoat layer 36 deposited on chrome layer 34 with layer 34 extending beyond the bounds of layer 36. Etching layer 36 ordinarily also etches the exposed portions of substrate 30, as shown. After testing the unit to be certain surface 38 is flat, the height of surfaces 40 and 50 are measured (such as with a stylus profilometer), and angle $\alpha$ is precisely measured. Data reflecting the heights of surfaces 40 and 50 and of angle $\alpha$ are recorded (such as by etching perceivable data onto a chrome layer deposited for that purpose or onto an appropriate location of substrate 30). Thereafter, excess chrome layer 34 extending beyond surfaces 40 and 50 is etched away, leaving the completed device as shown in FIG. 3F. Surface 38 of layer 36 and substrate 30 represent the plane 14 of the disk, and surface 40 represents the absolute height of the flying head standard. The height of surface 40 is measured in absolute terms, so production heads can be calibrated with the standard in absolute terms.

With reference to FIG. 1, it can be shown that the light reflected along path 20h is 180° out of phase relative to that reflected along path 20d. Further, it can be shown that the effects of the Snell effect are self-cancelling, resulting in the fact that path 20e is parallel to path 20a and the angle of light path 20h is equal to the incident angle plus twice the head orientation angle ($\theta + 2\alpha$). Therefore, whether testing production heads with the flying height tester or calibrating it in accordance with the prior art, the same alogithrms were used, accounting for the 180° phase shift, with the Snell effect not considered because it is self-cancelling. However, with reference unit 28 as the calibrating standard, the algorithms must be altered in at least three aspects: First, unlike the conditions of FIG. 1, the light reflected along path 42c is in phase relative to the light reflected along path 42a. Second the Snell effect affects the angle $\phi$ orientation of path 42a. In particular, angle $\phi$ is *not* equal to $\theta + 2\alpha$ as in FIG. 1, due to changes to the Snell angle caused by differences in interfacing media. Third, the index of refraction of glass, being greater than air, must be taken into account. As a result, when using reference unit 28 according to this invention, the algorithms for calibrating the flying height tester should compensate for the effects of the Snell angle, the index of refraction, and the phase relationship of paths 42b and 42a.

The present invention thus provides a reference standard for calibrating a flying head tester which is aore reliable than past standards, is rugged in use, and provides accurate calibration to absolute terms. The unit is easily used, with little change in calibration procedures, and provides an effective standard for absolute calibration of testers.

The invention is not to be limited by the embodiment shown on the drawings or decribed in the description, which is given by way of example and not of limitation, but only in accordance with the scope of the appended claims.

What is claimed is:

1. Calibration standard for calibrating flying height testers by simulating predetermined flying characteristics of magnetic heads comprising: a substrate; a reflective layer supported by a surface of said substrate; a transparent layer disposed over said reflective layer, said transparent layer having an upper surface arranged at an acute angle to said reflective layer, said acute angle representing a predetermined flying angle of magnetic heads over a disk; and optical reference means carried by said transparent layer on said upper surface a finite distance from said reflective layer as measured perpendicular to the upper surface, said finite distance representing a predetermined flying height of a magnetic head over a disk.

2. Apparatus according to claim 1 wherein said transparent layer has a side normal to said upper surface and said optical reference means comprises the edge intersecting said side and said upper surface.

3. A method of manufacturing a calibration standard for calibrating flying height testers comprising the steps of depositing a layer of reflective material onto a smooth surface of a substrate; depositing a layer of transparent material over said reflective layer; grinding opposite, substantially parallel surfaces of said device at a predetermined angle to said reflective layer, said angle representing a predetermined flying angle; and etching said transparent layer normal to the ground surface of said transparent layer to define a predetermined flying height by the minimum thickness of the transparent layer.

* * * * *